(12) United States Patent
Turner et al.

(10) Patent No.: US 7,077,529 B2
(45) Date of Patent: Jul. 18, 2006

(54) MASKED IMAGE PROJECTION SYSTEM AND METHOD

(75) Inventors: James A. Turner, Binghamton, NY (US); Ashok A. Sisodia, Arlington, TX (US)

(73) Assignee: L-3 Communications Corporation, New York, NY (US)

( * ) Notice: Subject to any disclaimer, the term of this patent is extended or adjusted under 35 U.S.C. 154(b) by 28 days.

(21) Appl. No.: 10/783,963

(22) Filed: Feb. 20, 2004

(65) Prior Publication Data

US 2005/0185150 A1  Aug. 25, 2005

(51) Int. Cl.
| | |
|---|---|
| G03B 21/00 | (2006.01) |
| G03B 21/14 | (2006.01) |
| G03B 21/26 | (2006.01) |
| G03B 35/00 | (2006.01) |
| G02B 27/22 | (2006.01) |

(52) U.S. Cl. ............................... 353/97; 353/7; 353/94; 353/121; 359/462; 352/57

(58) Field of Classification Search .................... 353/7, 353/94, 97, 121, 122; 359/449, 456, 457, 359/462; 352/57

See application file for complete search history.

(56) References Cited

U.S. PATENT DOCUMENTS

| | | | | |
|---|---|---|---|---|
| 1,216,835 | A |   | 2/1917 | Morris |
| 2,007,153 | A |   | 7/1935 | Boggs ............................ 88/17 |
| 2,351,032 | A | * | 6/1944 | Gabor ........................... 352/58 |
| 3,334,542 | A |   | 8/1967 | Wenthe et al. ................. 88/24 |
| 3,687,530 | A |   | 8/1972 | Watanuki ...................... 352/71 |
| 3,695,751 | A |   | 10/1972 | Watanuki ...................... 352/70 |
| 4,167,311 | A |   | 9/1979 | Pund ............................. 353/99 |
| 4,201,456 | A | * | 5/1980 | Wolbarsht .................... 353/101 |
| 5,179,399 | A |   | 1/1993 | Pringle ......................... 353/94 |
| 6,017,124 | A |   | 1/2000 | Siems ........................... 353/97 |
| 6,469,830 | B1 | * | 10/2002 | Dubin et al. ................. 359/449 |
| 6,578,969 | B1 |   | 6/2003 | Hinsching et al. ............ 353/97 |
| 2003/0107802 | A1 | * | 6/2003 | Dubin et al. ................. 359/449 |

* cited by examiner

*Primary Examiner*—Melissa Jan Koval
(74) *Attorney, Agent, or Firm*—Tiajoloff & Kelly

(57) ABSTRACT

A display apparatus for displaying projected images to a user comprises an enclosure with an aperture between the interior and exterior of the enclosure. A projector adjacent the aperture projects light through the aperture and against a screen surface to form an image that is visible to the user at a viewing station. A mask blocks the light from the projector proceeding to the eyepoint of the user. The method of the invention comprises projecting an image through the aperture onto the projection screen and blocking a portion of the light that is scattered from the last lens surface with the mask while permitting the image to proceed to the projection screen to be viewed.

37 Claims, 7 Drawing Sheets

MASKED IMAGE PROJECTION SYSTEM AND METHOD

FIELD OF THE INVENTION

This invention relates to the field of displays, and more particularly to the field of projection display systems, especially those used for simulators of aircraft or other vehicles.

BACKGROUND OF THE INVENTION

In projection systems used in vehicle simulator systems of the prior art, a user is seated enclosed in a set of screens or inside a spherical screen that surround the user and provide him with a field of view comparable to that in a real aircraft or other vehicle being simulated. In such systems, generally referred to as domes, usually several projectors are supported outside the surrounding screen structure.

Each projector projects a moving real-time image through an aperture in the screen structure to display a respective moving image that represents a part of the complete out-the-window view displayed to the user of the simulator. Several types of projectors can be used in this system, including scanning laser projectors. These scanning laser projectors each have a single laser beam that is modulated and caused to scan at very high speed through a projected image field so as to project or "paint" the image on the screen.

One concern associated with projectors, and especially laser projectors, is that laser light used in the projection is extremely bright. It is generally recognized as undesirable that this bright laser light be shone directly into the eye of the user, and that it should be viewed only reflected on a projection screen surface. Existing systems do not provide cost efficient systems of doing this with full reliability.

Another problem encountered is that, due to the imperfect nature of real-world optics, the surface of the last lens of the lens system of the projector virtually inevitably scatters part of the light passing therethrough. Since this lens surface is just outside the aperture through which the projector shines the image into the projection sphere, the user can look through the aperture and see the lens surface and the scattered light as a bright spot of light in the field of view. These bright spots at each of the projector apertures detract from the realism of the display, especially where the out-the window scene is of reduced light intensity, such as in a simulation of a night environment.

SUMMARY OF THE INVENTION

It is accordingly an object of the invention to provide a display system that avoids the drawbacks of the prior art.

It is further an object of the invention to provide a system wherein the projectors are not visible through the projection apertures in the projection structure.

It is also an object of the invention to prevent scattered light from a projector striking the eye of the user at any point in an eye volume of possible or probable eyepoints of the user's eye.

According to an aspect of the invention, a display apparatus comprises an enclosure defining an interior. The enclosure has an aperture therein communicating between the exterior and the interior. A screen surface generally opposes the aperture. A viewing station is configured to be occupied by a user having an eye located at an eyepoint. A projector is supported adjacent the aperture and projects light through said aperture and against said screen surface so as to form an image thereon that is visible to the user from the eyepoint. A mask is supported so as to block light from the projector proceeding to the eyepoint of the user.

According to another aspect of the invention, a display apparatus comprises a viewing station with a dummy cockpit structure adapted to receive the user. First and second projection screen portions face the user's eyepoint. The first projection screen portion has an aperture, and the first scanning laser projector includes a lens system receiving and refracting laser to shine in a light pathway therethrough and through the aperture so as to project an image on the second projection screen portion. A mask is supported between the aperture and the viewing station. The mask is configured so that it covers at least any part of the last optical surface of the projector visible through the aperture when viewed from any eyepoint in a viewing volume of the user, defined by the user's location, the user's probable or actual range of movement and the user's actual or estimated physiology. The mask has a surface generally facing the second projector, and the second projector projects light on the first screen portion and the surface of the mask so as to form a second image thereon that is visible to the user.

According to another aspect of the invention, a method of displaying an image is provided. The method comprises providing a projection screen portion generally facing the user, and a scanning laser projector having a laser generator that generates a laser that scans according to an electrical signal defining an image received thereby. The laser projector is caused to generate laser light and direct the laser light to the projection screen to form thereon the image defined by the electrical signal so as to be viewable by the user. A mask supported adjacent the laser projector is used to block a portion of the laser light traveling in a beam path that extends to the eyepoint of the user so that light from the laser generator does not directly strike the eye of the user.

It is further an object of the invention to provide a system in which the projector last optical surface is not visible to the user or to a second user in the same simulator through the projection apertures.

Other objects and advantages of the invention will become apparent from this specification.

DETAILED DESCRIPTION

Figure 1:
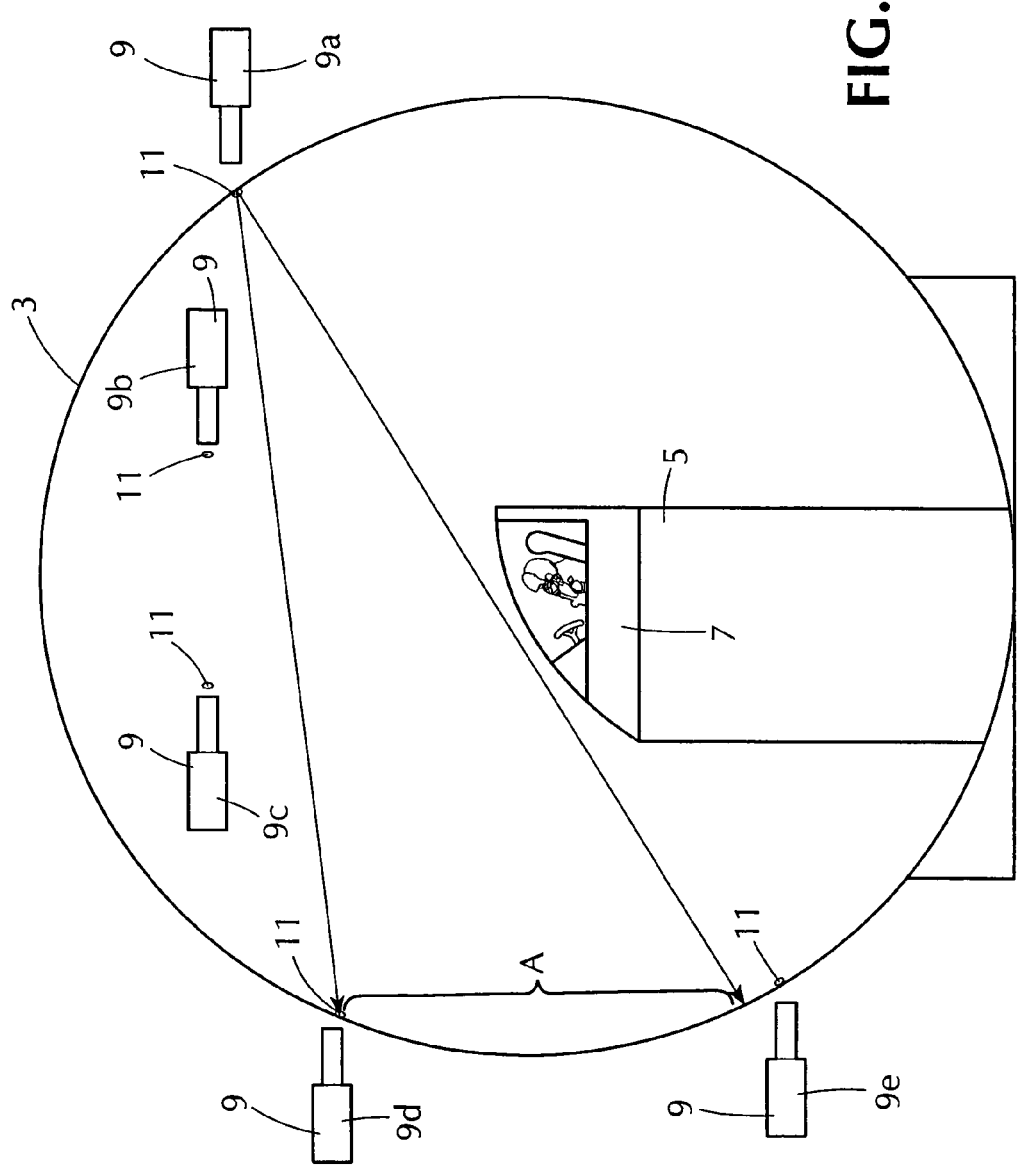
FIG. 1 is a schematic view of a dome-type projection system making use of the invention.

As best shown in FIG. 1, a projection system for a simulator comprises an enclosed, generally spherical projection screen structure or dome 3 surrounding a viewing station 5 that supports a user. The diameter of the dome 3 is preferably about forty (40) feet, and the user is preferably supported so that his eye is located approximately at the centerpoint of the sphere, although domes of different dimensions and with different eyepoint locations may advantageously make use of the present invention as well.

The viewing station 5 includes a cockpit structure 7 that mimics the cockpit of the real aircraft or other type of vehicle being simulated, with user controls that are monitored by a simulation computer that includes an image generator that generates appropriate imagery for projection on the interior surface of the projection screen structure 3.

According to the preferred embodiment, the imagery is projected by seven separate projectors 9 arranged and supported outside the dome 3 each projecting a respective image into the dome 3 through an aperture 11 to strike a projection surface portion of the inside surface of the dome 3 that generally faces the aperture 11. Each projector 9 projects a part of the overall image to be displayed to the user, and together the images displayed by the projectors combine to be an out-the-window (OTW) view for the user that corresponds to the field of view from the real vehicle.

One of the projected image fields is shown in FIG. 1 designated by reference character A, but it will be understood that each of the projectors 9 projects an image in a respective portion of the inner projection surface of dome 3. The projector 9a projecting the image in field A is referred to as the forward field-of-view projector, and it projects the view in front of the vehicle in simulation from behind the cockpit structure 7. Projector 9b projects the right quarter field of view, projector 9c projects the right aft field of view, projector 9d projects the aft view, and projector 9e projects the polar (straight upward) field of view. Two additional projectors are on the opposite side of the dome 3 and are not visible in FIG. 1, but are the left quarter and left aft projectors, roughly symmetrically placed to projectors 9b and 9c on the other side of the dome 3.

The projectors 9 of the preferred embodiment are preferably scanning RGB laser projectors that project full color images by a scanning laser beam that scanningly passes at high speed over the projection surface and "paints" the associated video image on it. Suitable laser projectors for this application are sold, for example, under the designation "Dome" by JENOPTIK LDT GmbH of Gera, Germany.

Figure 2:
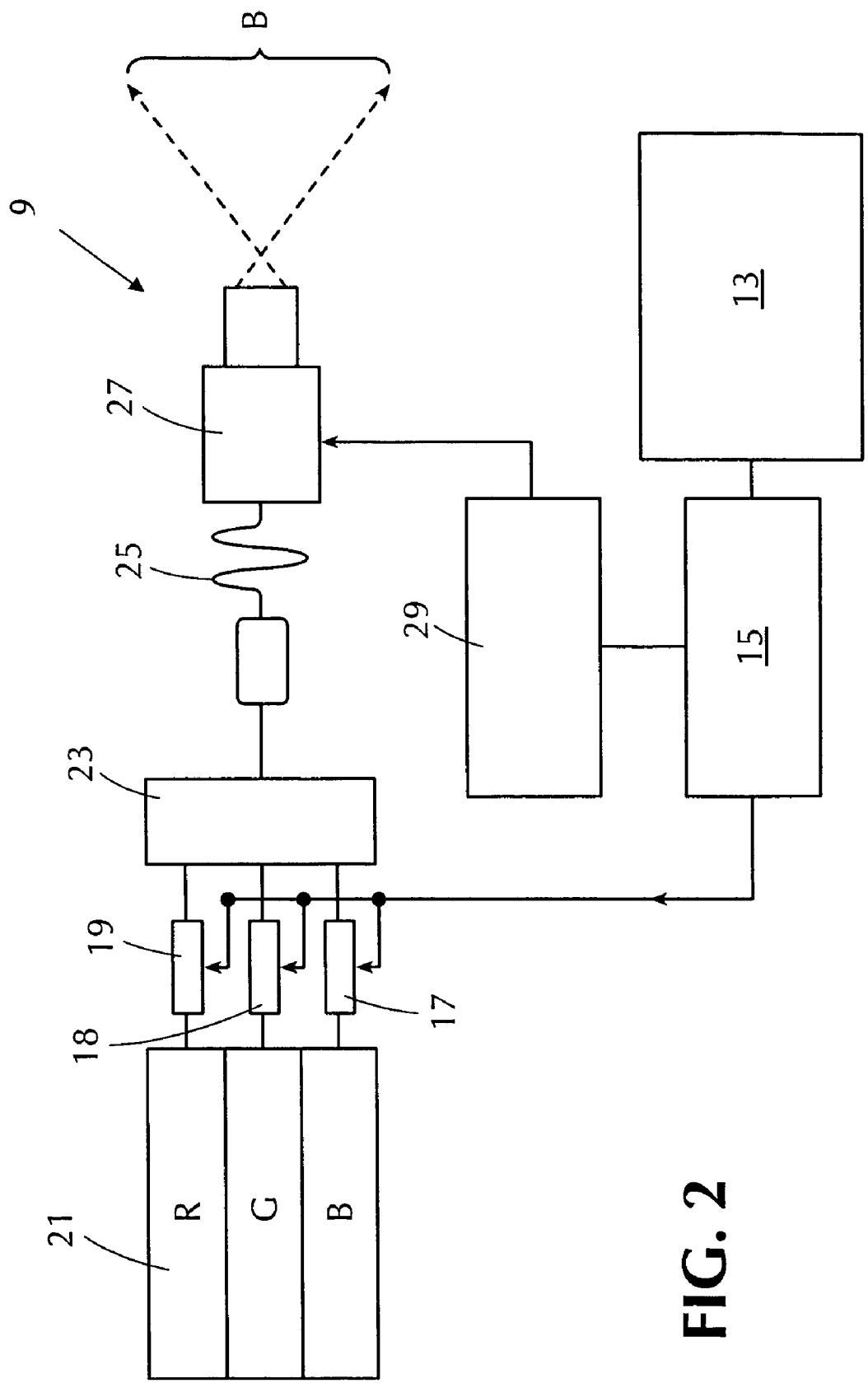
FIG. 2 is a schematic of the electronic system of the simulator and of a projector thereof.

FIG. 2 shows a schematic of a projector 9 and the supporting circuitry thereof. An image generator 13, usually a computer system that renders images for the OTW scene of the simulator, transmits electronic signals containing data defining time varying real-time video images to a video electronics circuit 15 of each of the projectors 9. Only one projector 9 is shown in FIG. 2, but it should be understood that all of the projectors 9 are similarly connected with the image generator and receive therefrom the video image data appropriate to that projector's part of the overall OTW field.

In each projector 9 of FIG. 1, as shown in the schematic of FIG. 2, video electronics 15 transmits appropriate signals to modulators 17, 18 and 19, each of which modulates a respective laser of a color, red, green or blue, produced by laser generator 21. The resulting modulated laser outputs are transmitted to beam combiner 23, which combines the modulated red, green and blue laser channels to a modulated multicolor laser output, which is transmitted through fiber optic cable 25 to a two-axis deflection unit 27, which is controlled by scanner electronics 29 so as to project time-varying video images by repeatedly scanning the multicolor laser over a projection surface in a field of projection rays generally indicated at B.

The deflection unit 27 of each projector 9 is supported adjacent an aperture 11 in the dome structure 3, and projects the laser light into the dome 3 so as to paint the associated image on the projection screen portion generally opposing the aperture 11.

Figure 3:
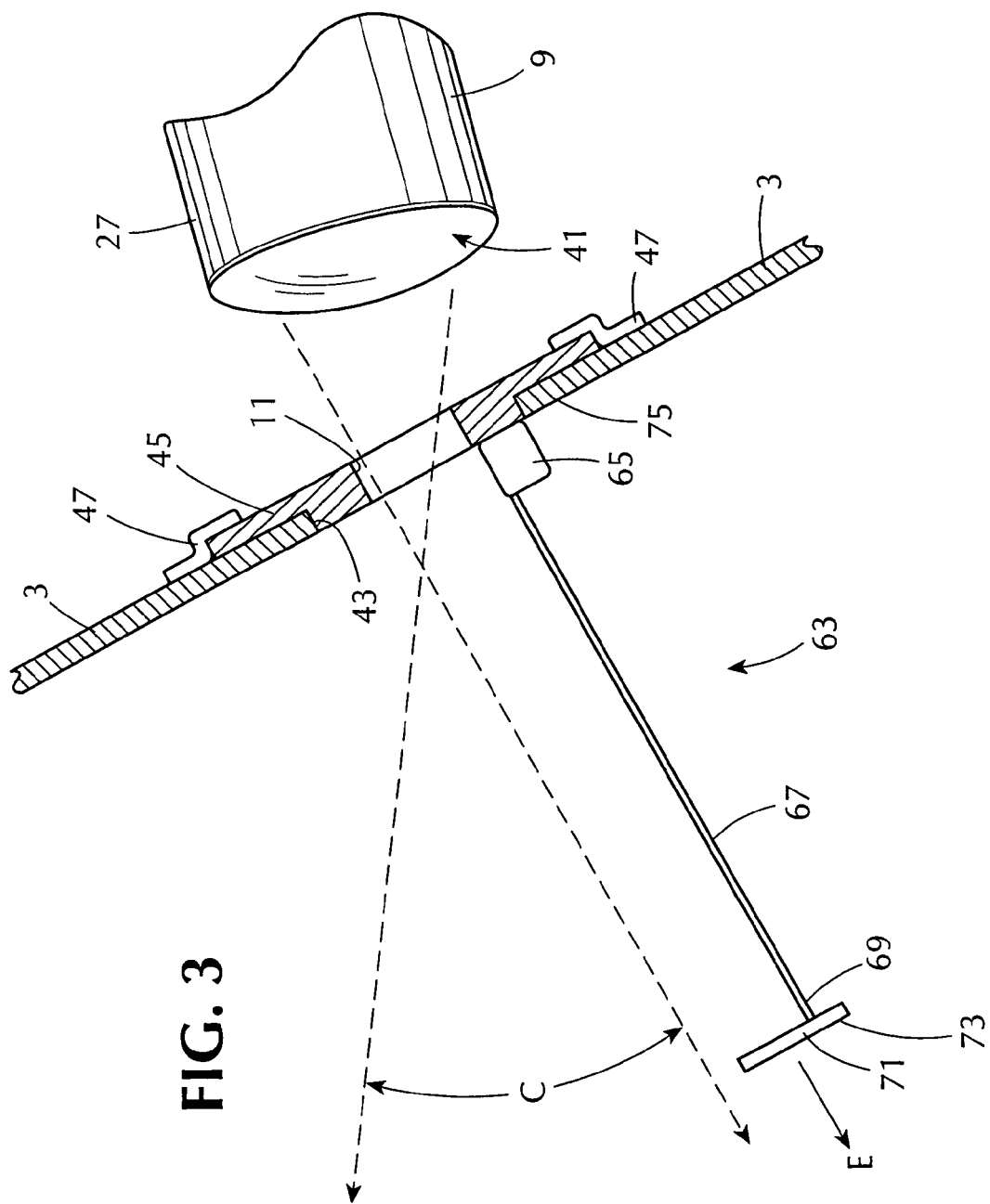
FIG. 3 is a detailed cross-sectional view taken from a plane normal to the spherical projection structure adjacent one of the projectors.

A detail view of the aperture 11 and associated structure is shown in FIG. 3. The dome 3 has an opening 43 in it that receives an aperture member 45, which is secured in the opening 43 by securement means or clips 47. The aperture 11 is an opening in the aperture member 45.

Referring again to FIG. 1, the scanning laser ray of each projector 9 is configured to scan a rectangular raster pattern. However, not all of this rectangular field is used by each projector to project its image. Due to the interrelations of the geometries of the different images projected by the several projectors on the inside of spherical projection dome 3, the shape of the image to be projected is not normally the full rectangular raster field, but rather a shaped image configured to fit with the other images projected next to it. In addition, the projectors 9 usually are pointed in a direction in which the raster field of the scanning laser overlies the cockpit structure 7 on which there is no projected image. The shape of the image output of the raster field is therefore cropped to avoid projecting any part of an image on the dummy cockpit structure 7 in the apparatus.

Figure 4:
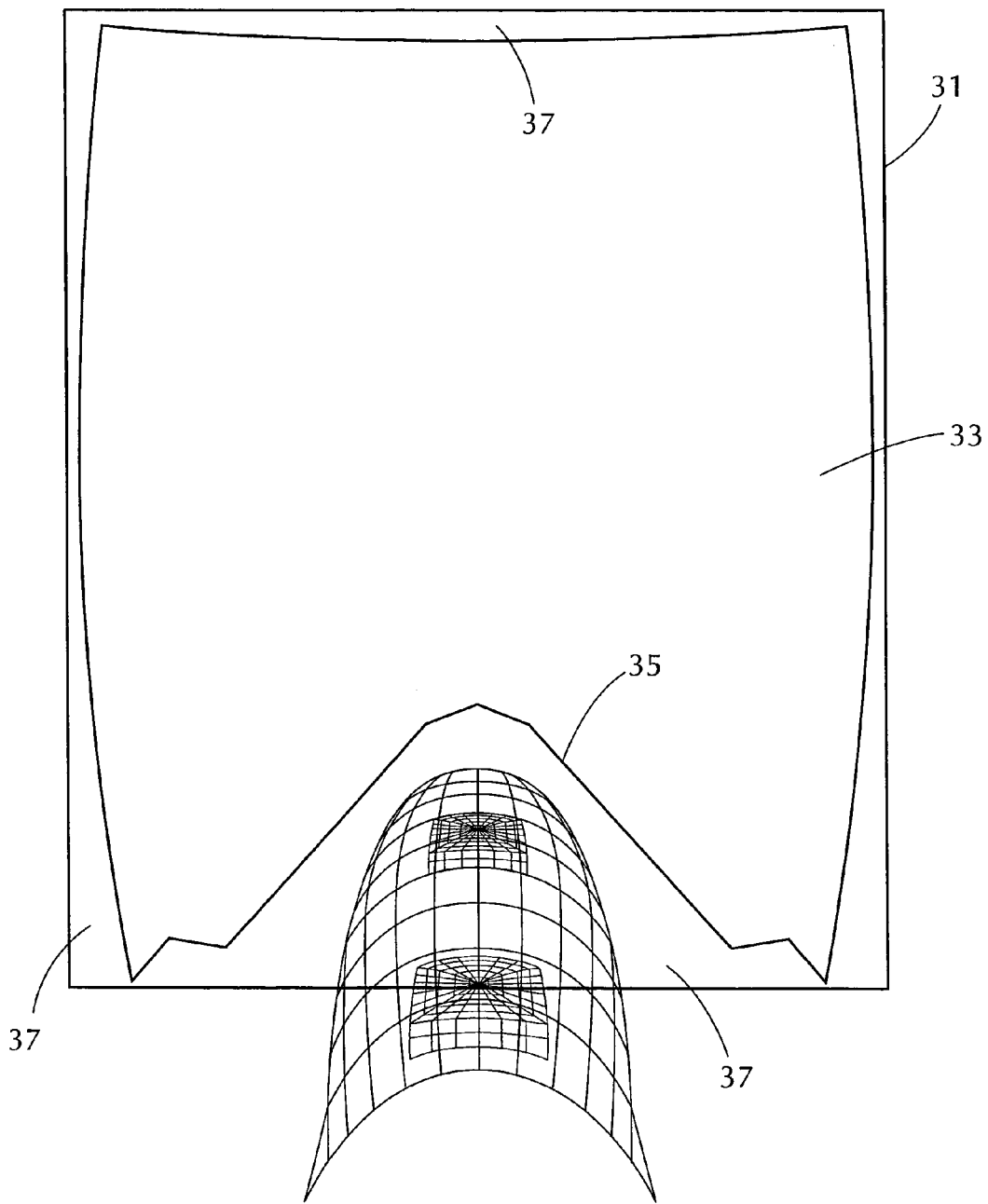
FIG. 4 is a diagram of the raster pattern output of the forward field-of-view projector of the invention.

An example of this shaped-image output is shown in FIG. 4, which is the raster pattern usage for the forward field of view projector 9a, which is positioned behind the user and projects the straight-ahead part of the OTW scene. The output raster field 31 for the projector 9a is not used in its entirety. Only a smaller portion 33 of the field contains a shaped image to be projected on the interior of dome 3. Around the upper part and sides of the pattern, the image is contoured to accommodate the geometry of the adjacent fields of projection in the dome 3. At the bottom portion of the raster pattern, there is a substantial indentation 35 of the working portion of the image to clear the cockpit structure 7, the position of which is illustrated in FIG. 4 by the wireframe contour. The unused perimeter portion 37 of the raster pattern is colored black, i.e., no light is projected in that area of the projection field.

It will be understood by those in the art that for the other projectors 9 in the system of FIG. 1, analogous shaped images are used to properly fit with the adjacent images projected by the other projectors 9 of the system. Also, the shape of the cockpit cut-out indentation 35 varies depending on the profile of the canopy structure 7, which is different depending on the angle of viewing.

Depending on the precise positioning of the deflection unit 27 of the projector 9 and the shape of the image, whether left, right, forward or aft, the aperture 11 for the individual projector 9 is configured to be just large enough and of the correct shape for the laser light projecting the shaped image to pass through the aperture 11 without the space being any larger around the aperture passage, with tolerances worked in for manufacture, assembly and alignment. Since the actual image shape varies amongst the various projectors 9, the sizes and shapes of the apertures vary to accommodate the varying projector images.

The contouring of the raster patter generally prevents projected light from the projector 9 striking the cockpit structure 7 during normal operation because the part of the projected pattern directed to points on the cockpit structure 7 is black.

There is a scattering effect of light created in the optics of the projector lens system of deflection unit 27, or whatever lens system is used in the projector, that produces scattered light at the last lens surface 41 of the projector 9. This is the case whether a laser projector, incandescent-light projector, or any other type of projector is used. The result of this last-surface scattering is that the last lens is visible as a source of bright light even when seen from the side.

The projectors 9 are usually placed close to the apertures 11 associated therewith, usually about 3 or 4 inches away from the dome surface, which is necessitated by the geometry of the system, i.e., the rays exiting the projector 9 first converge to a narrow field to pass through the aperture 11, which is as small as possible, and then the rays cross and diverge to project the full field of view for the associated projector 9. Since the last lens surface 41 of the projector 9 has to be so close to the aperture, the user almost inevitably has a line of sight to the lens surface 41, which he can see as a very noticeable bright spot in the OTW scene, which is especially unrealistic and distracting in a low-intensity-light simulation, for example a night mission in an aircraft simulator.

As best shown in FIG. 3, to avoid the problem of this bright visible spot at the apertures 11, each aperture is provided with an inside-the-dome mask structure 63. Mask structure 63 comprises a base 65, which is preferably a magnetic element that attracts ferritic metal of the aperture member 45 and is secured thereby. The magnetic connection allows for easy adjustment of the position of the mask structure 63 during placement and thereafter as necessary, with access to the technician doing the adjustment being provided through a nearby access hatch (not shown) in the dome 3. Rod or armature 67 extends from the base 63 in a substantially radially inwardly direction E, which extends to the user's eyepoint, and at its inward end 69 supports opaque mask portion 71 at an appropriate distance, as will be explained below, that in the preferred embodiment is about 7.5 inches (190 mm) from the inward surface of the dome 3, for the front projector.

Mask portion 71 is shaped and positioned vertically, horizontally and radially of the dome 3 with respect to the aperture 11 based on a few considerations. First, mask portion 71 should not interfere with projection of the image from projector 9 in its appropriate display area, labeled C in FIG. 3. Second, mask portion 71 should cover any part of the last optical surface 41 visible to the user through the aperture 11 so that the user does not see the projector last surface 41. Third, mask portion 71 should be as small as possible to cover the aperture adequately. Finally, it must be considered that the mask portion is a part of the projection surface for another projector 9 on the other side of the dome 3 and should not impact substantially on display of that projected image.

Figure 5:
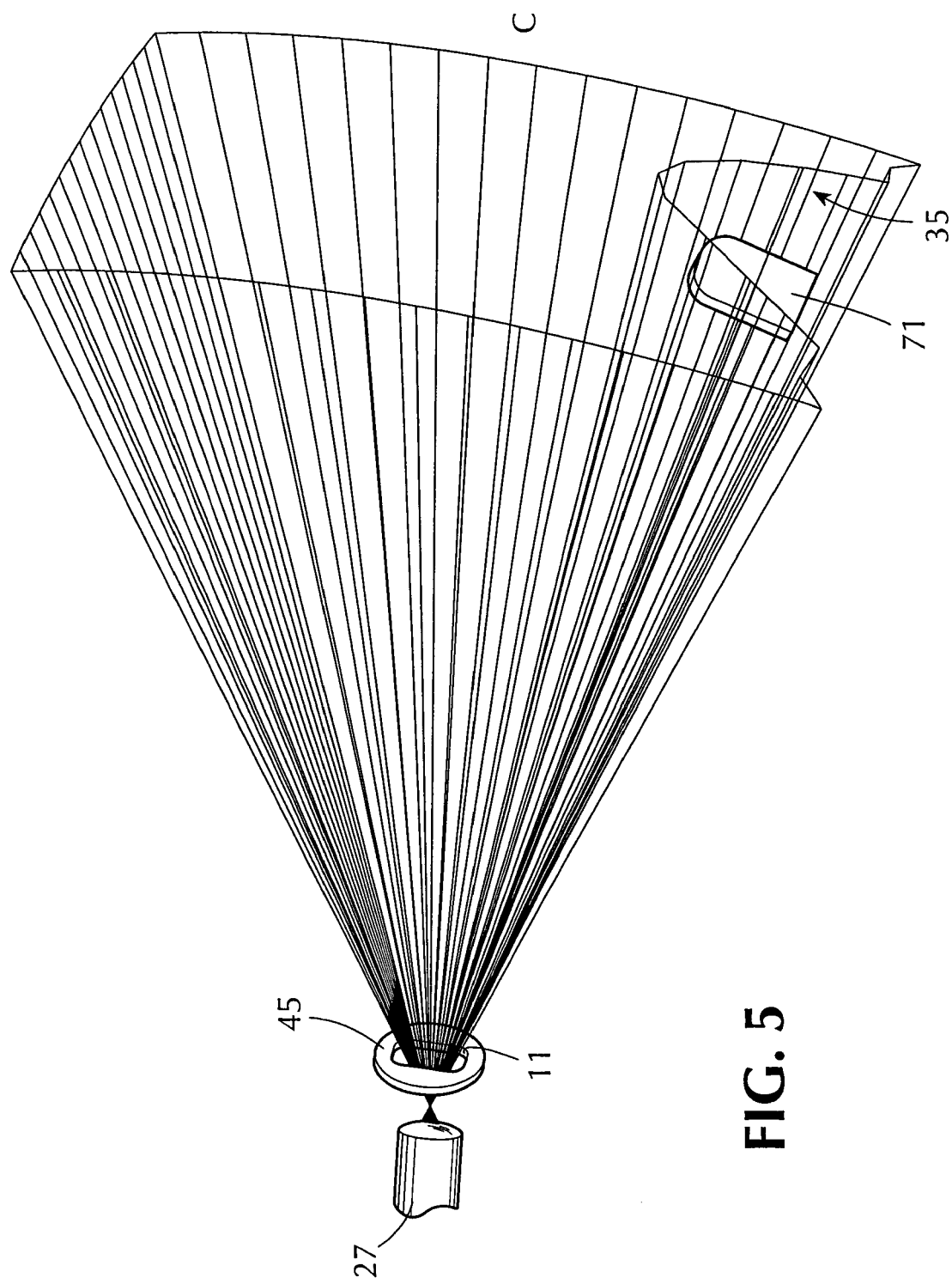
FIG. 5 is a diagram of the ray spread of an image from one of the projectors with a mask inside of the dome blocking sight of the dome opening by the user.

With respect to the first consideration, the mask portion 71 is configured to occult any part of the last optical surface 41 of the projector 9 that is visible through the aperture 11 from the eyepoint of the user, or from any point in an eye volume made up of all possible eyepoints, or all likely eyepoints, that the user's eye will take. When a cockpit structure is present in an apparatus using the invention, the user's eye will always be inside the cockpit structure, and the entire mask portion 71 therefore covers the part of last optical surface 41 visible in the aperture 11 relative to a set of points that are in the cockpit structure. As a result, as best seen in FIG. 5, the mask portion 71 therefore lies in the dark portion 37 of the raster of the projected image, that is, the cutout portion 35 of the projected image field C that is removed to prevent the image projecting on the cockpit structure.

Figure 6:
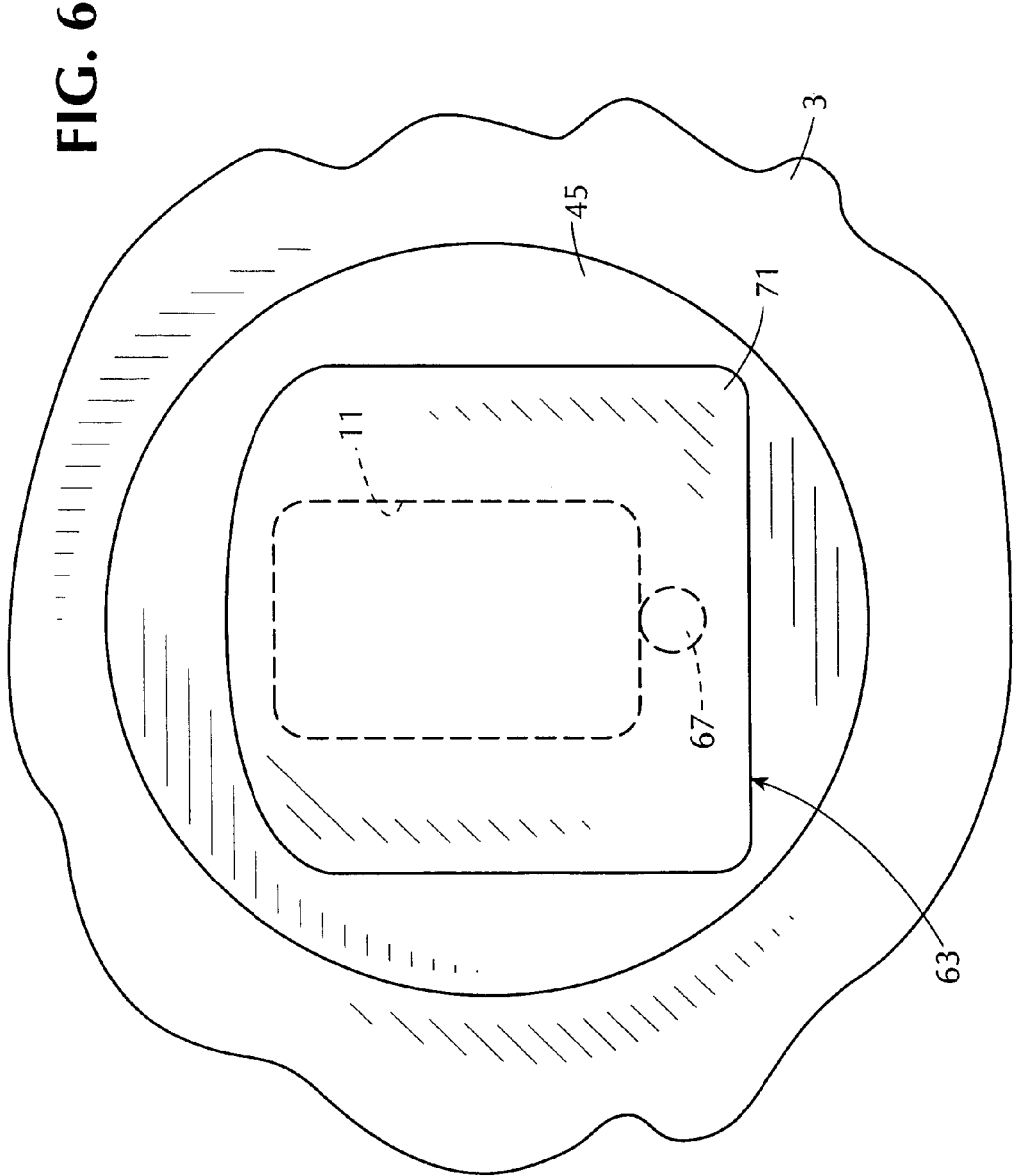
FIG. 6 is a view from the user's center eyepoint position of the inside-the-dome mask structure overlying the aperture in the dome.

In terms of covering the part of the last optical surface 41 visible in aperture 11, FIG. 6 shows the view of the mask structure 63 and aperture 11 from a central eyepoint of the user. Viewed from this eyepoint, the aperture 1 lies roughly centrally behind the mask portion 71, and the user cannot see the bright point of the projector lens 41. It is not necessary that the entire aperture 11 be covered, but only that the mask portion 71 cover at least the part of the last lens surface 41 that is visible in the aperture 11. Armature 67 is also not visible behind the mask portion 71.

The mask portion 71 extends outwardly from its central coverage of aperture 11 to cover a slightly larger area. This larger shape is provided to cover the part of the last lens surface 41 that is visible in the aperture 11 even if the user moves so that his eye is no longer at the central eyepoint of the dome 3, but elsewhere in a predetermined eye volume. Preferably, the eye volume used to determine the size and shape of mask portion 71 is the space defined by the user's eye moving left about 8 inches or right about 8 inches, up about 2 inches, down about 8 inches, forward about 12 inches, and backward about 2 inches. The range of movement is conceptually based on a sort of pivoting of the user on his seat as a vertex, with some possible curvature of his body. This group of eyepoints represents the set of likely or probable positions that the user will move his eye to, and these points make up an eye volume that can be used to design the precise shape of the mask portion 71 for the particular visible last lens surface 41 in the particular aperture 11 involved. The mask portion 71 is shaped and located so that the part of the last lens surface 41 that is visible in the aperture 11 is not visible, or is substantially covered, when viewed from every eyepoint in the eye volume.

The above eye volume does not represent a very large angular change at the surface of the dome, as the dome is 40 feet in diameter. As an example of the dimensions, in the forward projector example being described here, the mask portion 71 is approximately 0.9 inches by 0.8 inches. The aperture 11 is substantially smaller than that.

The above-described range of eyepoint movements does not encompass all possible movements of the user's head nor does it include every conceivable position of the user's eye. It is rather an estimate of the not-unusual or likely locations that the eyepoint can be in. A larger volume (and different shape and size of mask portion 71) could be derived by calculating all the possible, albeit unlikely, positions of the user's eye, and using the resulting eye volume to configure the mask portion 71.

The shape and size of each aperture 11 may differ from the others because the shape of the image portion projected varies from projector to projector. The mask portion 71 will accordingly vary to ensure coverage of the part of the last lens surface 41 that is visible therein. Alternatively, the mask portion 71 can be a shape that is easy to fabricate, such as a circle, which is of adequate size to cover all or at least a substantial part of the last lens surface 41 that is visible in the associated aperture.

In addition, the mask portion 71 and the inner surface of the dome 3 at the aperture all serve as a projection surface for another projector 9 at the other side of the dome 3, and an image is projected thereon. In the preferred embodiment, mask portion 71 has a planar surface 73 facing the eyepoint of the user, and this surface is effectively parallel to the plane of the associated aperture 11 and a plane tangent to the spherical dome shape at the aperture 11. To minimize the visible impact of the mask portion 71 on the user, the mask portion surface 73 is preferably given a surface with suitable optical qualities, usually by a process of application of projection surface or dome surface paint material, that matches the inward facing projection surfaces of the aperture member 45 and the dome 3, which are preferably surfaced with the same or similar optical material or process. Base 65 is also surfaced in the same way to minimize its visibility.

To minimize stray reflections, the back of the masking portion facing the aperture 11 is preferably painted black.

Figure 7:
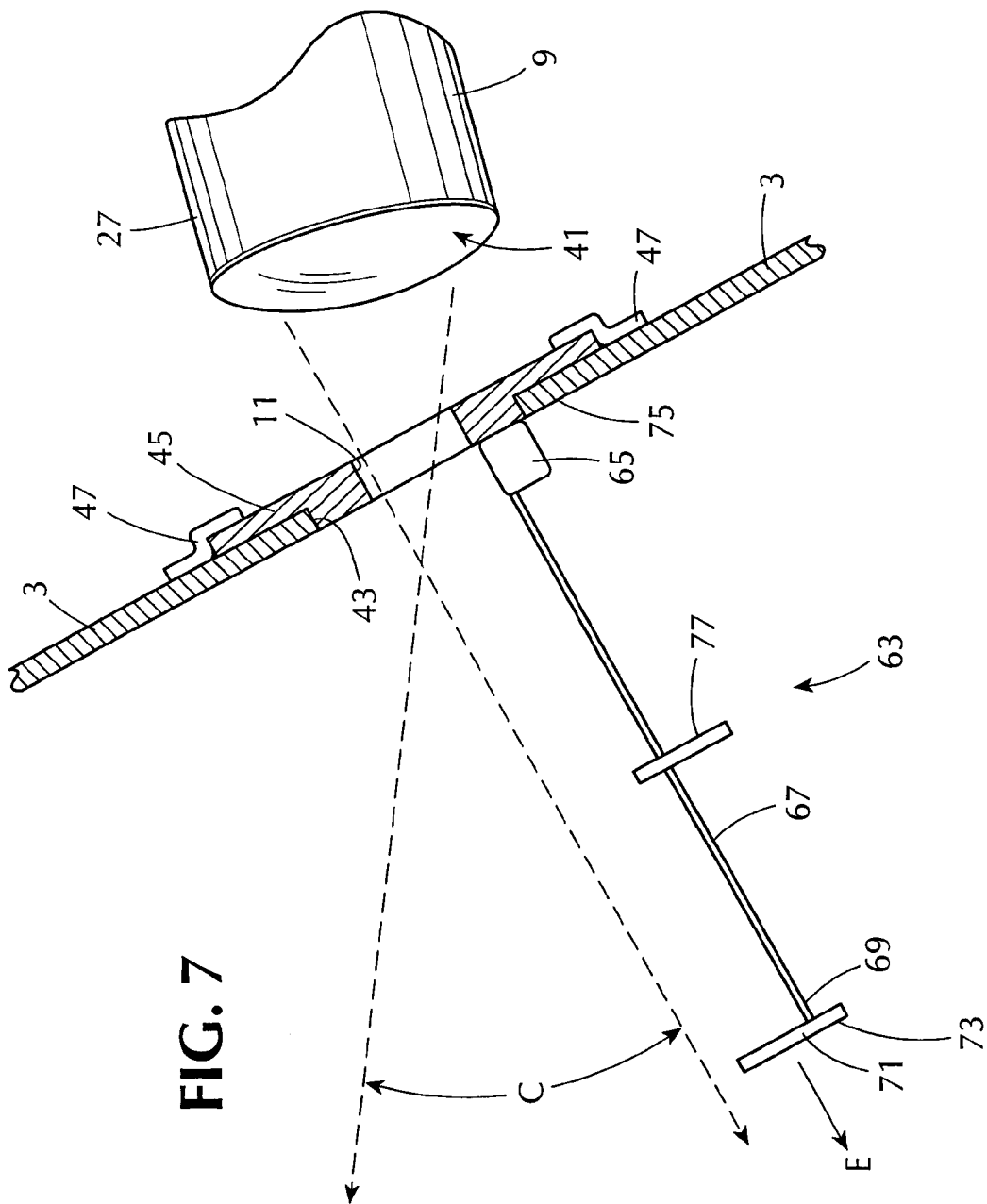
FIG. 7 is a view as in FIG. 3, but showing an alternate embodiment of the mask structure of the invention, where a second mask is provided for a second user in the system, such as a weapons systems officer in a two-person aircraft simulator.

FIG. 7 shows an alternate embodiment of the invention for use especially in a two-person aircraft simulator where the pilot has a weapons systems officer (WSO) sitting behind him. The WSO represents another eye volume of eyepoints that should be blocked from viewing the projector lens 41 in addition to the eye volume of the pilot. Since the WSO is fairly close behind the pilot, a second mask portion 77 can be provided usually on the same armature 67, as shown in FIG. 7. The same considerations apply to the WSO mask portion 77, in that it should be as small as possible, but still cover the part of the last lens surface 41 that is visible in the aperture 11 from the eye volume of the WSO position.

It will be understood that the invention herein extends well beyond the embodiments of the disclosure. For example, while a dome projection system has been used here to exemplify the features of the invention, other arrangement, such as planar screen systems, and also enclosed systems made up of a number of planar projection screens can readily make use of the invention.

The present invention is also applicable to a wide variety of applications involving projection outside the area of simulators. The features of the invention are especially beneficial in the area of laser projectors, but are also applicable to more conventional types of projectors, e.g., those relying on incandescent bulbs or other light sources, as well.

The terms used in this specification should be understood to be language of description, not limitation, as those of skill in the art with this specification before them will be able to make changes and modifications therein without departing from the scope of the invention.

What is claimed is:

1. A display apparatus comprising:
   an enclosure defining an interior, said enclosure having an aperture therein communicating between the exterior and the interior;
   a screen surface generally opposing said aperture;
   a viewing station configured to be occupied by a user having an eye located at an eyepoint;
   a projector supported adjacent the aperture and projecting light through said aperture and against said screen surface so as to form an image thereon that is visible to the user from the eyepoint;
   a mask supported so as to block light from the projector proceeding to the eyepoint of the user.

2. A display apparatus according to claim 1, wherein said mask is supported inward of the aperture between the aperture and the eyepoint, said mask being positioned so as to not obstruct projection of light that forms the image on the screen surface.

3. A display apparatus according to claim 2, wherein the mask is configured so as to completely cover any part of a last lens surface of the projector that is visible in the aperture when viewed from the eyepoint.

4. A display apparatus according to claim 3, wherein the screen surface is an inwardly facing concave surface that extends around the aperture, and
   wherein the system further comprises a second projector projecting light so as to form a second image on the screen surface surrounding the aperture.

5. A display apparatus according to claim 4, wherein the mask has an inward surface facing the eyepoint, said inner surface being a projection surface of substantially the same reflective qualities as the screen surface, a portion of the second image being formed on the inward surface of the mask.

6. A display apparatus according to claim 5, wherein the inward surface of the mask is planar and parallel to the aperture.

7. A display apparatus according to claim 4, wherein the screen surface is of a spherical shape.

8. A display apparatus according to claim 3, wherein the mask is configured to cover any part of a last lens surface of the projector visible through the aperture when viewed from any point in a viewing volume around the eyepoint, said viewing volume being an estimate of a set of points to which the eye of the user can move while the user is at the viewing station.

9. A display apparatus according to claim 3, wherein the mask is supported on a support structure extending from a location adjacent the aperture to the mask, said support structure extending behind the mask so that said support structure is not visible from the eyepoint.

10. A display apparatus according to claim 9, wherein the enclosure has therein a second aperture receiving therein an aperture fixture, said aperture fixture defining the first aperture, said support structure being supported on the aperture fixture.

11. A display apparatus according to claim 1, wherein the enclosure has a screen surface portion thereon around the aperture and facing inwardly thereof, said aperture fixture having an inward face of similar reflective qualities to the screen surface portion and flush therewith.

12. A display apparatus according to claim 11, wherein said support structure is supported on said aperture fixture.

13. A display apparatus according to claim 12, wherein said support structure is movably supported on said aperture fixture so that the position of the mask can be adjusted.

14. A display apparatus according to claim 13, wherein the support structure and the aperture fixture have a magnetic engagement with each other that allows adjusting movement of the mask.

15. A display apparatus according to claim 1, wherein the display apparatus is a simulator for a vehicle having a cockpit, and the viewing station includes a dummy cockpit assembly adapted to surround the user, the image projected by the projector being shaped so that no part of the projected light thereof strikes the cockpit assembly.

16. A display apparatus according to claim 1, wherein the projector is a scanning laser projector.

17. A display apparatus according to claim 1, wherein the image is a time-varying real-time image.

18. A display apparatus according to claim 17 wherein the image is received from an image generating computer system.

19. A display apparatus according to claim 1, wherein said viewing station is configured to be occupied by a second user in addition to said first user, said second user having an eye located at a second eyepoint; and a second mask supported so as to block light from the projector proceeding to the second eyepoint of the second user.

20. A display apparatus according to claim 19, wherein the second mask is configured to cover any part of the last lens surface of the projector visible through the aperture when viewed from any point in a second viewing volume around the second eyepoint, said second viewing volume being an estimate of a set of points to which the eye of the second user can move while the user is at the viewing station.

21. A display apparatus according to claim 20, wherein first and second masks are supported on a member projecting inward from said wall structure adjacent said aperture.

22. A display apparatus for displaying projected images to a user, said apparatus comprising:
a viewing station adapted to support the user such that an eye of the user at a point in time is at an eyepoint in a predetermined viewing volume of possible eyepoints of the user at said viewing station;
first and second projection screen portions facing the eyepoint, the first projection screen portion having therein an aperture;
said first projector projecting an image on the second projection screen portion;
a mask supported between the aperture and the viewing station, said mask being configured so that the mask covers any part of a last lens surface of the first projector viewable through the aperture from any eyepoint in the viewing volume;
said mask having a surface generally facing the second projector; and
said second projector projecting light on said first screen portion and said surface of said mask so as to form a second image thereon that is visible to the user.

23. The apparatus according to claim 22 wherein the first and second screen portions are parts of a continuous general spherical portion projection screen member.

24. The apparatus according to claim 22 wherein the second screen portion and the surface of the second mask have identical or substantially identical reflective properties.

25. The apparatus according to claim 22 wherein said images are time-varying real-time video images.

26. The apparatus according to claim 25 wherein the images are received from an image generating computer system.

27. A display apparatus according to claim 22 wherein said viewing station is configured to be support a second user in addition to said first user, said second user having an eye located at a second eyepoint at said point in time in a predetermined second viewing volume of possible eyepoints of the second user at said viewing station; and
a second mask supported between the aperture and the viewing station, said second mask being configured so that the second mask covers any part of a last lens surface of the first projector viewable through the aperture from any eyepoint in the second viewing volume;
said second mask having a surface generally facing the second projector; and
said second projector projecting light on said first screen portion and said surfaces of said first and second masks so as to form a second image thereon that is visible to the first and second users.

28. A method of displaying an image to a user seeing from an eyepoint at a viewing station, said method comprising:
providing a projection screen portion generally facing said user, and a projector adjacent a wall structure having an aperture therein;
generating an electrical signal defining an image and transmitting said electrical signal to the projector so as to cause the projector to project light corresponding to said image through said aperture and against said projection screen portion so as to form said image thereon so as to be viewed by the user; and
blocking with a mask supported in or adjacent the projector a portion of said light that is scattered from a last lens surface of the projector and is traveling so as to strike the eyepoint of the user while permitting said light of said image to proceed without obstruction to said projection screen.

29. The method according to claim 28, wherein said blocking blocks light directed to eyepoints in a viewing volume containing said eyepoint, said viewing volume being defined by a range of possible eyepoints for said user at said viewing station.

30. The method according to claim 29, wherein said mask is positioned between the aperture and the viewing station, said mask being configured and located such that the mask occults any part of the last lens surface of the projector that is in a line of sight from any eyepoint in the viewing volume through said aperture.

31. The method according to claim 30, and further comprising placing the mask adjacent the aperture on an adjustable structure, and adjusting said mask so that the last lens surface of the projector is occulted from every eyepoint in the viewing volume.

32. The method according to claim 30, wherein said wall structure supports a screen structure facing the user, said screen structure having said aperture extending therethrough, said method further comprising projecting a second image on said screen structure adjacent said aperture.

33. The method according to claim 32, wherein said mask has a surface facing the second projector, said second projector directing light for a portion of said second image against said surface of said mask so as to form thereon a portion of said second image.

34. The method according to claim 28, and further comprising generating said electronic signal with an image generator, said image generator transmitting a plurality of time varying images that are displayed by the projector to the user.

35. The method according to claim 28, wherein said viewing station includes a cockpit structure.

36. The method according to claim 28, and further comprising
blocking with a second mask supported in or adjacent the projector a further portion of said light that is scattered from the last lens surface of the projector and is traveling so as to strike an eyepoint of a second user in said viewing station.

37. The method according to claim 36, wherein said blocking blocks light directed to eyepoints in a second viewing volume containing said eyepoint of said second user, said second viewing volume being defined by a range of possible eyepoints for said second user at said viewing station.

* * * * *